United States Patent [19]

Hueser

[11] Patent Number: 5,375,247

[45] Date of Patent: Dec. 20, 1994

[54] APPARATUS FOR CONTROLLED SWITCHING OF A MICROCOMPUTER TO STANDBY MODE

[75] Inventor: Klaus Hueser, St. Peter Ording, Germany

[73] Assignee: Robert Bosch GmbH, Stuttgart, Germany

[21] Appl. No.: 635,183

[22] PCT Filed: Jul. 28, 1988

[86] PCT No.: PCT/EP88/00684

§ 371 Date: Jan. 3, 1991

§ 102(e) Date: Jan. 3, 1991

[87] PCT Pub. No.: WO90/01189

PCT Pub. Date: Feb. 8, 1990

[51] Int. Cl.⁵ ............................ G05F 1/00; G06F 11/00
[52] U.S. Cl. ........................................ 395/750; 365/229
[58] Field of Search ................. 395/750; 123/480; 318/510; 364/431.11, 200, 900; 365/226, 229; 371/9.1, 12, 16.3

[56] References Cited

U.S. PATENT DOCUMENTS

| | | | |
|---|---|---|---|
| 4,122,359 | 10/1978 | Breikss | 365/229 |
| 4,250,858 | 2/1981 | Jeenicke et al. | 123/480 |
| 4,279,020 | 7/1981 | Christian et al. | 364/900 |
| 4,327,298 | 4/1982 | Burgin | 395/750 |
| 4,433,390 | 2/1984 | Carp et al. | 395/750 |
| 4,502,446 | 3/1985 | Kanegae et al. | 123/494 |
| 4,512,019 | 4/1985 | Bodig et al. | 364/431.11 |
| 4,541,050 | 9/1985 | Honda et al. | 364/431.11 |
| 4,558,416 | 12/1985 | Pauwels et al. | 364/900 |
| 4,580,220 | 4/1986 | Braun et al. | 364/431.11 |
| 4,629,907 | 12/1986 | Kosak | 364/431.11 |
| 4,638,465 | 1/1987 | Rosini et al. | 365/226 |
| 4,651,286 | 3/1987 | Fukai et al. | 364/510 |
| 4,653,003 | 3/1987 | Kirstein | 364/431.11 |
| 4,750,040 | 6/1988 | Hakamada | 365/229 |
| 4,777,626 | 10/1988 | Matsushita et al. | 365/226 |
| 4,817,049 | 3/1989 | Bates et al. | 395/750 |
| 4,827,149 | 5/1989 | Yabe | 365/229 |
| 4,843,592 | 6/1989 | Tsuaki et al. | 371/12 |
| 4,864,998 | 9/1989 | Onishi | 123/480 |
| 4,878,196 | 10/1989 | Rose | 364/900 |
| 4,924,399 | 5/1990 | Kaiser et al. | 123/480 |
| 4,959,786 | 9/1990 | Glowczewski et al. | 364/200 |
| 4,977,537 | 12/1990 | Dias et al. | 364/200 |
| 4,992,951 | 2/1991 | Glowczewski et al. | 395/775 |
| 5,023,527 | 6/1991 | Erdman et al. | 318/138 |

FOREIGN PATENT DOCUMENTS

| | | |
|---|---|---|
| 0284276 | 9/1988 | European Pat. Off. . |
| 3248680 | 9/1983 | Germany . |
| 3340008 | 5/1984 | Germany . |
| 60-73720 | 4/1985 | Japan . |
| 61-177523 | 8/1986 | Japan . |

Primary Examiner—Allen R. MacDonald
Assistant Examiner—George Davis
Attorney, Agent, or Firm—Michael J. Striker

[57] ABSTRACT

A voltage regulator connected to a microcomputer is switched from main power to standby power by a monitoring integrated circuit in response to a switch off by the control circuit after receiving a switch off command, from an ignition switch, and only after the computer has been reset. The monitoring integrated circuit has a plurality of circuit elements including a circuit element which generates a control signal for switching the voltage regulator to a state producing a standby voltage which powers the microprocessor to save the information in the microprocessor memory. Preferably the circuit element generating the control signal is an operational amplifier whose output is fed by a time delay network which delays switching of the voltage regulator.

4 Claims, 1 Drawing Sheet

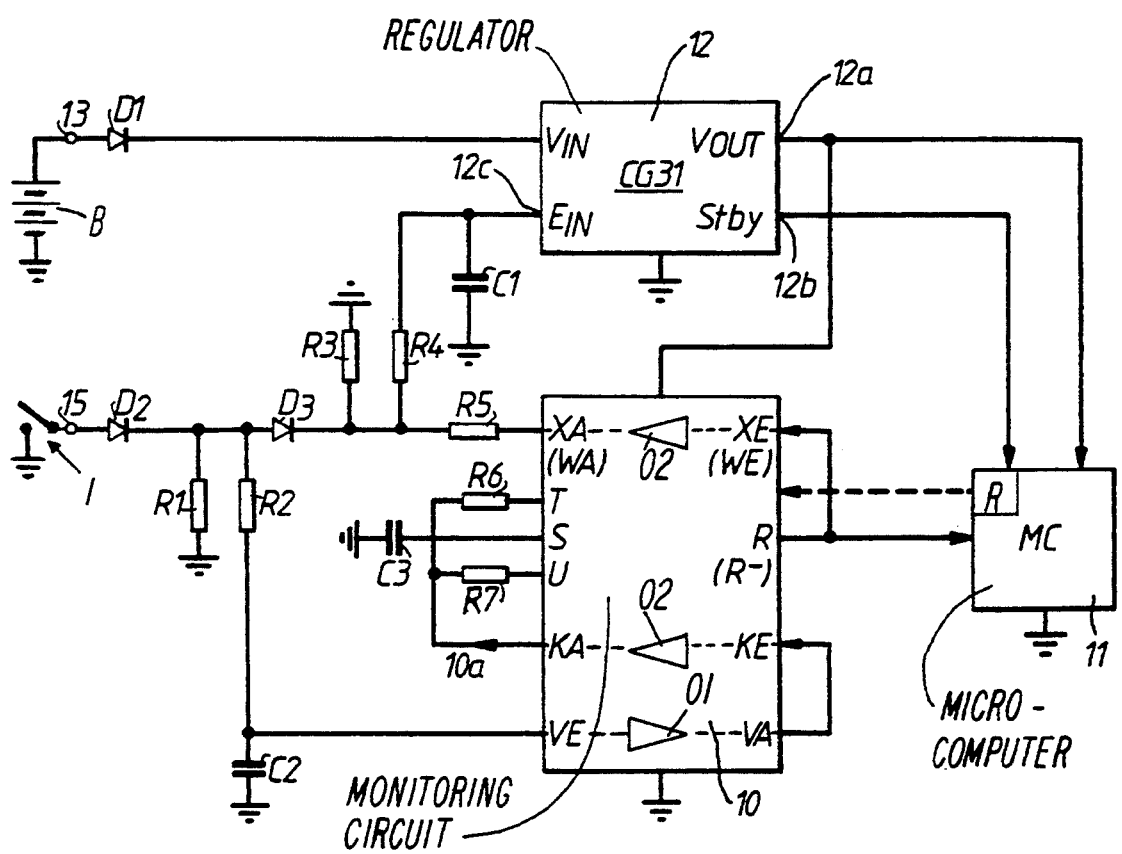

APPARATUS FOR CONTROLLED SWITCHING OF A MICROCOMPUTER TO STANDBY MODE

BACKGROUND OF THE INVENTION

The present invention relates to circuitry for switching a microcomputer to a standby mode once the microcomputer is in a defined state, normally a reset state.

It is known that, if one wishes to retain information in a random access memory (RAM), it is necessary to provide a standby power supply connected to the RAM even when an associated microprocessor is switched off. Care must be taken, however, to ensure that the information contained in the RAM is not changed when the microcomputer is switched off in the middle of accessing a RAM.

Various circuits have been proposed for achieving a controlled switch-over to standby supply for a RAM. Unfortunately, many of these circuits utilize a number of components and occupy a relatively large amount of space. Until now, this has rendered them inappropriate for incorporation in hybrid devices used for multicircuit electronic equipment used in motor vehicles.

U.S. Pat. No. 4,512,019 describes a circuit for monitoring a microcomputer and, in particular, a circuit for resetting the microcomputer when a malfunction occurs or when the supply voltage drops to a value below a predetermined level.

In Patent Abstracts of Japan, Vol. 9, No. 214, p. 384 and JP 60-73 720 a device for preventing the destruction of stored data in a RAM is described. In this device the base of a switching transistor installed between the main power source and the power input terminal of the RAM is connected to the output terminal of a voltage-drop detecting element.

A device for maintaining operation as long as the voltage fluctuations of a main power source are within a predetermined range of recommended working source voltages of a CMOS-RAM is described in Patent Abstracts of Japan, Vol. 10, No. 389, P. 531 & JP 61-177 523. Therefore a relay contact for switching between the main power source and a chargeable type secondary backup battery is proposed.

SUMMARY OF THE INVENTION

It is an object of the present invention to provide an apparatus for switching a random access memory of a microcomputer to standby power.

The present invention provides a power supply arrangement for a microcomputer comprising regulator means for supplying a regulated main voltage or a regulated standby voltage to a microcomputer, and a monitoring integrated circuit having a plurality of circuit elements which is connected to the microcomputer for sending a resetting signal to the microcomputer. A circuit element of the monitoring integrated circuit has an output connected to a control input of the regulator means via a threshold circuit. The monitoring integrated circuit is arranged to generate, in response to a resetting signal after a predetermined time delay, a control signal for switching the regulator means when the microcomputer has reached a defined state for switching to a standby mode. The advantage of the above-described arrangement is that an existing circuit can be utilized without any redesign of the circuit itself.

In more detail, the voltage regulator means has a control input for receiving an "on" signal to switch the voltage regulator means to supply the regulated main power to the microcomputer, but when the "on" signal is not present at the control input the regulated standby power is supplied. The "on" signal is delivered by means for providing the "on" signal which include an ignition switch so that, when the ignition switch is switched, the "on" signal is provided at the control input and the voltage regulator means delivers the main power to the microcomputer. The monitoring integrated circuit provides a resetting signal in response to the "on" signal which is also provided to it at a monitoring input. A time delay network including a capacitor and resistors is provided connected to the control input and to the monitoring integrated circuit. This time delay network provides a time interval during which the "on" signal is maintained at the control input of the voltage regulator means after switching the ignition switch to provide the standby power.

BRIEF DESCRIPTION OF THE DRAWING

The objects, features and advantages of the present invention will now be illustrated in more detail by the following detailed description, reference being made to the accompanying drawing in which:

The sole FIGURE is a circuit diagram of a preferred embodiment of a power supply arrangement for a microcomputer according to the invention.

DETAILED DESCRIPTION OF THE PREFERRED EMBODIMENT

The present invention is based on an existing integrated circuit represented generally by the reference numeral 10, which comprises a number of operational amplifiers and components of a "watchdog circuit".

The structure and operation of the circuit 10 is described in more detail hereinbelow.

Associated with circuit 10 is a microcomputer 11 supplied with power from a voltage regulator 12 which, in turn, is connected via an input terminal 13 to the battery B of the vehicle. The voltage regulator 12 supplies two regulated voltages: a main regulated power supply voltage $V_{out}$ from the $V_{out}$ output terminal 12a during normal operation, and standby power supply voltage Stby from the output terminal 12b. The standby power supply is used to retain information in RAM R associated with the microcomputer 11. As is known, operation of the ignition switch I connected to terminal 15 is detected and a signal supplied to an ON input 12c which causes the voltage regulator to switch ON or OFF.

In the present embodiment, the terminal 15 connected to the ignition switch I is connected to the terminal 12c of the voltage regulator via diodes D2, D3 and resistor R4. A diode D1 is inserted in the connection between the terminal 13 and the main power supply to the regulator 12. The diodes D1 and D2 are used as polarity reversal protection diodes.

With the ignition switch I in its ON condition, a voltage signal is present at the terminal 15 and the voltage regulator 12 is in its normal operating condition supplying power to the microcomputer 11 from the output terminal 12a. A signal is also present on the VE input of the circuit 10 via resistor R2 which is connected to the output of the diode D2. The input terminal VE is the noninverting input of an operational amplifier 01 whose output is taken from the terminal VA and fed to the input terminal KE of an additional operational amplifier 02 having an open collector output KA. The output KA is of high impedance and enables via line 10a the watchdog circuit containing a part of the integrated circuit 10 and external components R6, R7, C3. The watchdog circuit is supplied with a watchdog signal WD shown with the dashed line in the FIGURE from the microcomputer 11 by which it monitors operation of the microcomputer and provides a reset signal in the event of a malfunction. It also provides a reset signal in response to a change in potential at input S. Thus a change in potential at the input S is reflected by a change in output potential at the output R (reset) which is connected to the microcomputer 11. The watchdog circuit may be a monitoring circuit of the type described in U.S. Pat. No 4,512,019 assigned to the same assignee. In normal operation, with the ignition switch closed, the potential at input S is high which means that the output at R is low and the microcomputer is not reset. The level of the signal at output R is fed to the inverting input XE of an additional operation amplifier 03 whose output XA is connected via a time delay network of resistors R5 and R4 and capacitor C1 to the control terminal 12c of the voltage regulator 12. Diode D3 decouples the output XA from the input VE.

When the ignition switch I is switched OFF. the voltage on terminal 15 disappears and after a capacitor C2 connected to the input terminal VE has discharged below a low triggering threshold, the output VA switches to a low potential which, in turn, switches the output KA to a low potential to turn off the watchdog circuit by lowering the potential at input S. In turn, the output R goes high which resets the microcomputer 11 and also provides a high potential input to the terminal XE. Because the amplifier connected between XE and XA is inverting, the potential at output XA goes low and this in turn causes the potential at 12c to drop to a low potential after a capacitor C1 of the time delay network connected thereto has discharged and the microcomputer has reached a defined state for switching to standby mode. A low potential at input 12c causes a first transistor in the regulator 12 to switch on thus removing voltage from the base of a main transistor and turning it off. This causes the voltage regulator 12 to switch to provide a standby voltage on the terminal 12b to maintain the RAM R with standby power.

It will be appreciated that the above arrangement can be modified for different types of monitoring integrated circuits 10. For example, the flip-flop between terminals S and R could provide a noninverted output which would result in a change for the amplifier connected between terminals XE and XA to be a noninverting amplifier. Further, as indicated by the dashed line the microcomputer itself, by detecting a low voltage at VA, can provide the necessary watchdog signal to cause the monitoring integrated circuit 10 to generate the appropriate change in potential at the terminal 12c of the voltage regulator to switch the voltage regulator to a standby mode.

I claim:

1. A power supply arrangement for a microcomputer having an associated random access memory means, comprising a battery, voltage regulator means for producing a regulated main power at a main voltage and a regulated standby power, said voltage regulator means being connected to a microcomputer having a random access memory to supply the regulated main power to the microcomputer when the microcomputer is switched on and the regulated standby power to the microcomputer to retain information in said random access memory when the microcomputer is switched off, and said voltage regulator means having a control input for receiving an "on" signal to switch the voltage regulator means to supply the regulated main power to the microcomputer, said voltage regulator means supplying said regulated standby power when said "on"signal is not present at said control input;

means for providing the "on" signal connected electrically to the control input, said means for providing including an ignition switch;

a monitoring integrated circuit means for producing a resetting signal to the microcomputer connected electrically to the microcomputer, said monitoring integrated circuit means having a monitoring input connected electrically to said means for providing the "on" signal and producing a resetting signal in response to an "on" signal received at said monitoring input;

a time delay network including a capacitor and resistors connected to the monitoring integrated circuit means to maintain the "on" signal at said control input for a time interval after the ignition switch has been switched off to trigger the voltage regulator means to supply the regulated standby power to the microcomputer so that the voltage regulator means continues to supply the regulated main power for the time interval, said time interval being of a sufficient duration so that the microcomputer has reached a defined state in response to the resetting signal produced by the monitoring integrated circuit means before said voltage regulator means switches to provide said regulated standby power to said microcomputer.

2. A power supply arrangement according to claim 1, wherein said monitoring integrated circuit means has a safety input for receiving a self-monitoring signal from the microcomputer to reset the microcomputer when the microcomputer malfunctions.

3. A power supply arrangement for a microcomputer having an associated random access memory means, comprising a battery, voltage regulator means for producing a regulated main power at a main voltage and a regulated standby power, said voltage regulator means being connected to a microcomputer having a random access memory to supply the regulated main power to the microcomputer when the microcomputer is switched on and the regulated standby power to the microcomputer to retain information in said random access memory when the microcomputer is switched off, and said voltage regulator means having a control input for receiving an "on" signal to switch the voltage regulator means to supply the regulated main power to the microcomputer, said voltage regulator means supplying said regulated standby power when said "on" signal is not present at said control input;

means for providing the "on" signal connected electrically to the control input, said means for providing including an ignition switch;

a monitoring integrated circuit means for producing a resetting signal to the microcomputer connected electrically to the microcomputer, said monitoring integrated circuit means having a monitoring input connected electrically to said means for providing the "on" signal and producing a resetting signal in response to an "on" signal received at said monitoring input;

a watchdog circuit for producing the resetting signal, the monitoring integrated circuit means including two operational amplifiers connected electrically in series between the monitoring input and the watchdog circuit so that the resetting signal is generated in response to a change in potential at the monitoring input as a result of receiving the "on" signal; and a time delay network including a capacitor and resistors connected to the monitoring integrated circuit means to maintain the "on" signal at said control input for a time interval after the ignition switch has been switched off to trigger the voltage regulator means to supply the regulated standby power to the microcomputer so that the voltage regulator means continues to supply the regulated main power for the time interval, said time interval being of a sufficient duration so that the microcomputer has reached a defined state in response to the resetting signal produced by the monitoring integrated circuit means before said voltage regulator means switches to provide said regulated standby power to said microcomputer.

4. A power supply arrangement as defined in claim 3, wherein the time delay network comprises a circuit consisting of the capacitor and one of the resistors, said circuit being connected electrically in series between the control input and the monitoring integrated circuit means.

* * * * *